United States Patent [19]
Bellis

[11] Patent Number: 5,142,880
[45] Date of Patent: Sep. 1, 1992

[54] AUTOMATIC FAN CONTROL (AFC) UNIT OF LOW COST AND DURABLE CONSTRUCTION AND RELATED PROGRESS FOR IMPROVING THE EFFICIENCY OF EXISTING AIR CONDITIONING SYSTEMS

[76] Inventor: Robert E. Bellis, 700 7th St., Boulder City, Nev. 89005

[21] Appl. No.: 254,453

[22] Filed: Oct. 6, 1988

Related U.S. Application Data

[63] Continuation-in-part of Ser. No. 56,272, May 26, 1987, abandoned, which is a continuation of Ser. No. 793,392, Oct. 31, 1985, abandoned.

[51] Int. Cl.$^5$ ............................................. F25D 17/00
[52] U.S. Cl. ...................................... 62/182; 62/158; 62/186
[58] Field of Search ............... 62/180, 186, 157, 158, 62/234, 182; 165/12; 236/11, 46 R, 46 E, 46 F, 49.1, 49.3

[56] References Cited

U.S. PATENT DOCUMENTS

| | | | |
|---|---|---|---|
| 4,075,864 | 2/1978 | Schrader | 62/180 |
| 4,136,730 | 1/1979 | Kinsey | 165/12 |
| 4,369,916 | 1/1983 | Abbey | 236/11 |
| 4,485,966 | 12/1984 | Cartmell et al. | 236/46 R |

*Primary Examiner*—Harry B. Tanner
*Attorney, Agent, or Firm*—William J. Bethurum

[57] ABSTRACT

A solid state control circuit operative for connection to existing low-voltage thermostat terminals of a central, forced-air, air-conditioning system having a compressor and an indoor blower (referred to herein as a "fan") and gas-fired or electrical heating elements. Automatic means is provided for starting the blower simultaneously when the compressor or electric heating elements are turned on, but the blower continues to run by a timer for a predetermined timed period after the compressor is stopped, during cooling and heat pump heating, and is stopped simultaneously when the heating elements are turned off during electric heating. The control circuit is automatically inoperative with gas heat, since the blower in gas heating systems is controlled by a separate plenum thermostat which introduces start and stop delays independent of the room thermostat.

4 Claims, 3 Drawing Sheets

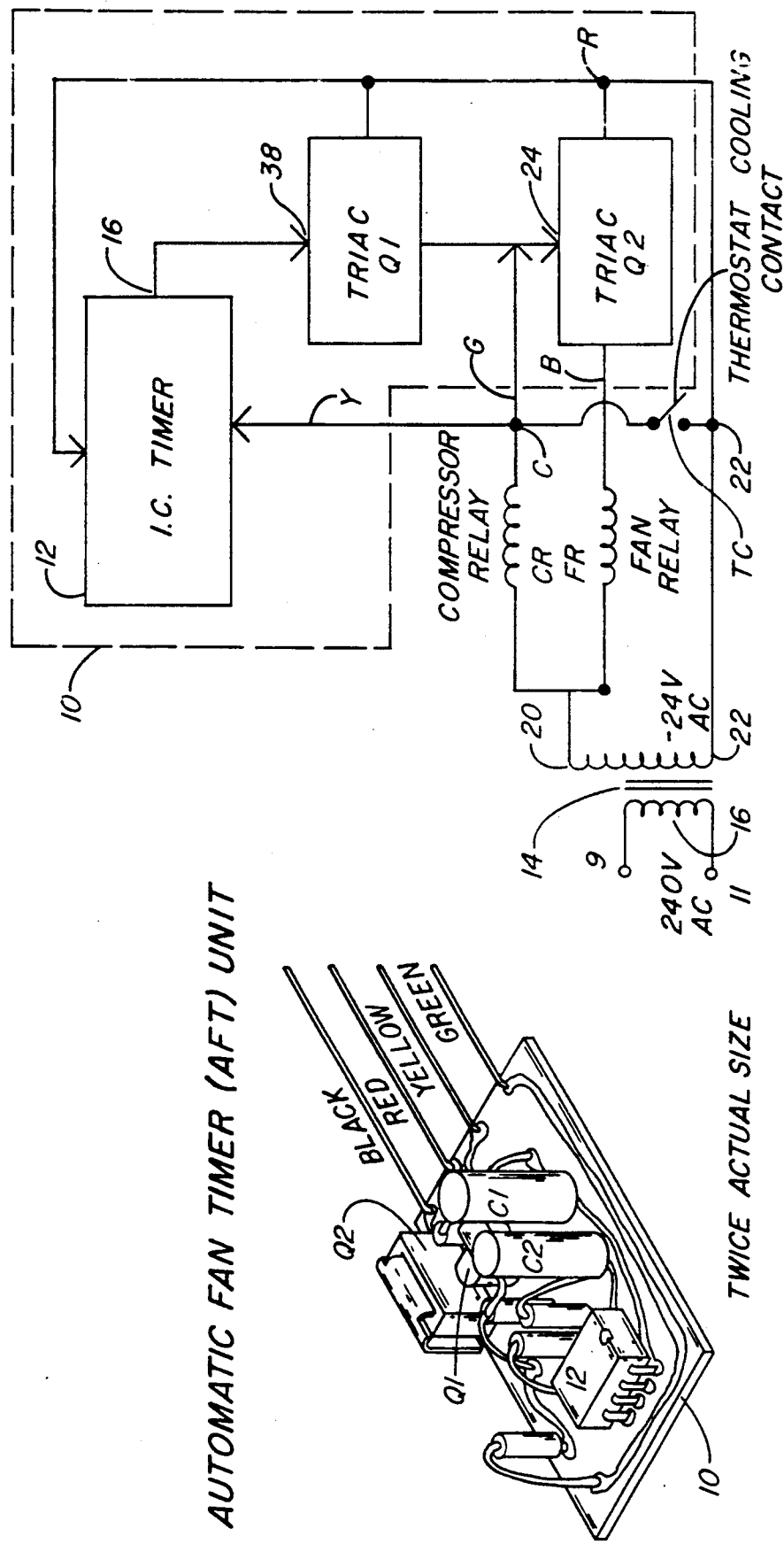

AUTOMATIC FAN CONTROL (AFC) UNIT OF LOW COST AND DURABLE CONSTRUCTION AND RELATED PROGRESS FOR IMPROVING THE EFFICIENCY OF EXISTING AIR CONDITIONING SYSTEMS

RELATED APPLICATIONS

This application is a continuation-in-part of my application Ser. No. 56,272, abandoned filed May 26, 1987 which in turn is a continuation of my parent application Ser. No. 793,392, abandoned filed Oct. 31, 1985.

TECHNICAL FIELD

This invention relates generally to systems for increasing the efficiency of air conditioning units by continuing the blower (fan) running time thereof after the compressor is turned off. More particularly, the invention is directed to improving such efficiency by the use of a novel, small control circuit unit capable of construction on a small printed circuit board which is operative for connection into the low-voltage thermostat of an air conditioning system. In this manner, the components and associated ciruitry of existing air-conditioning systems need not be modified.

BACKGROUND

In most conventional air-conditioning systems, the duty-cycle of the compressor and its associated indoor fan are identical. That is, when the compressor starts, the fan starts. When the compressor is stopped, the fan simultaneously stops. This kind of duty cycle control is somewhat inefficient in that a considerable amount of "cold" is left in the cooling coil and ducts after the compressor is shut off. Some of this cold is dissipated to the outside atmosphere unless the indoor fan is kept running for some time after the compressor is stopped.

There are certain other air cooling control systems on the market which function in the just-described manner and do in fact continue to run the indoor fan for a given time after the compressor shuts off. However, to the best of my knowledge, these systems are relatively expensive and require changes or additions in the existing wiring.

SUMMARY OF THE INVENTION

The general purpose of this invention is to provide a unique method and circuitry for controlling the duty cycle of an indoor cooling fan in an efficient manner which is of unquestionable and substantial value from the energy-saving standpoint. To accomplish this purpose, I have developed novel fan-control circuitry which includes a relatively inexpensive integrated circuit (IC) timer. When the compressor is running, this timer is inoperative, but when the compressor is stopped, the timer is energized and produces an output voltage for a predetermined time during which the fan is kept running. Thus, the "cold" left in the cooling coil and ducts is salvaged, rather than being partially dissipated into the surrounding outside ambient.

In a preferred embodiment of my invention, I use two sensitive-gate TRIACs in a novel electrical circuit configuration to control the fan relay. The cost that these two TRIACs and other necessary passive components adds to an existing air-conditioning system is minimal, particularly when considering that this invention can operate to produce a substantial reduction in energy consumption for the same comfort level.

Other novel features and advantages of my invention will be better understood by reading the following description of the accompanying drawings wherein:

BRIEF DESCRIPTION OF DRAWINGS

FIG. 1 is an isometric view of the 4-terminal energy-saving timer control unit according to the present invention as it is constructed on a small rectangular printed circuit board measuring about 1" by 1½".

FIG. 2 is a schematic functional diagram which serves to illustrate the basic control functions of the timer control circuit in FIG. 1.

FIG. 4 also shows the specific connections to the compressor relay and the fan relay of a heating and cooling system under control of the present invention.

DESCRIPTION OF THE PREFERRED EMBODIMENTS

Figure 3:
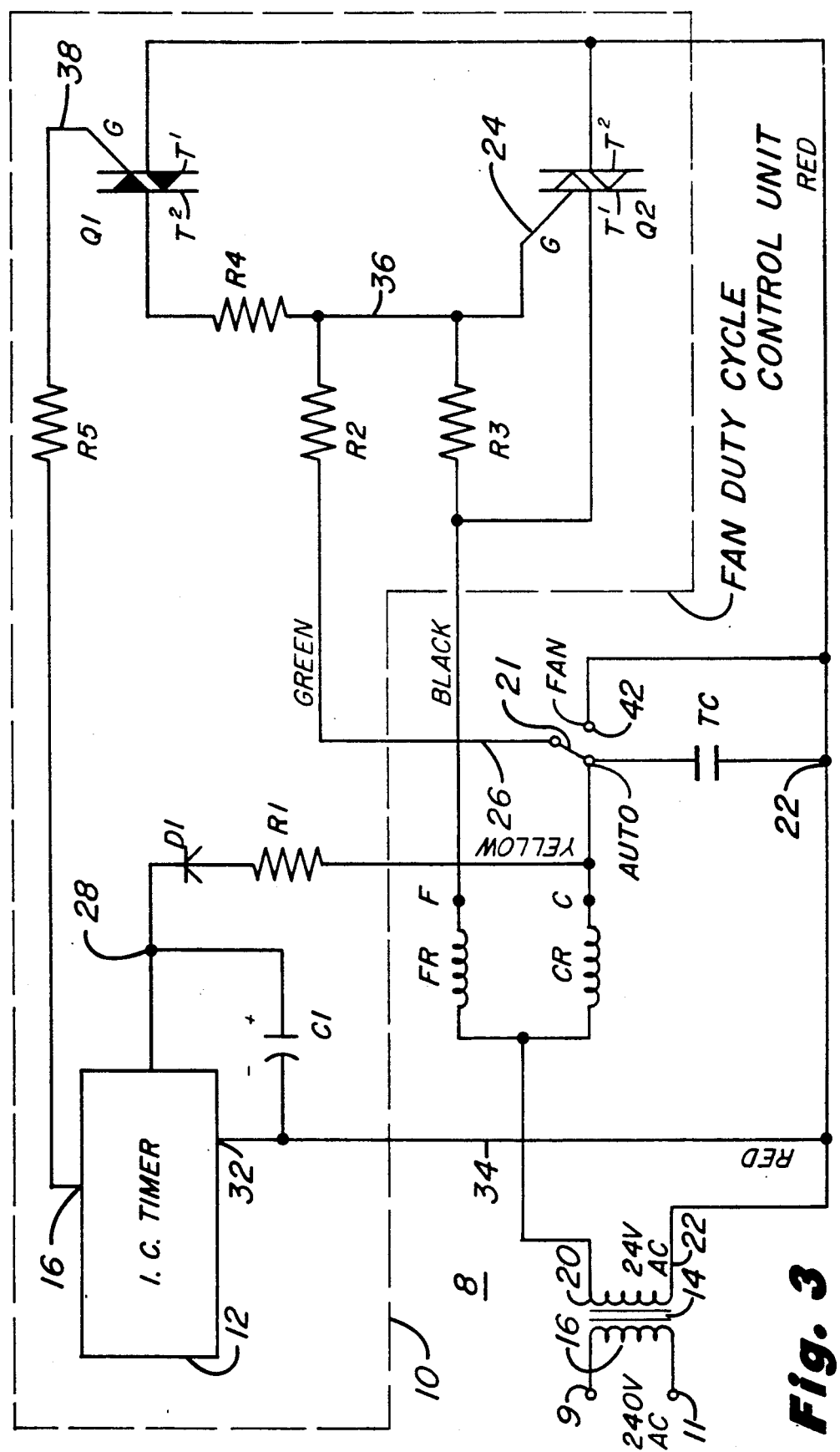
FIG. 3 is a more detailed circuit diagram of a preferred embodiment of the invention, but omitting the circuit details of the room thermostat to which it is connected when in use.

Referring now to FIG. 1, this isometric view of the automatic fan timer (AFT) unit according to the present invention is intended to show that this unit can be constructed entirely upon a small one (1) inch by one and one-half (1 and ½) inch printed circuit board 10. This size of the supporting member 10 is quite suitable for carrying a pair of sensitive gate TRIACs Q1 and Q2, a integrated circuit (IC) timer 12, and several other passive components, whose functions are described in more detail in the description of the remaining figures. It is important to note, however, that the AFT unit in FIG. 1 is connectable via its four (4) leads which are typically colored red (R), green (G), black (B), and yellow (Y) to the low-voltage room thermostat terminals of an existing air conditioning system. These connections are made without any additions to the wiring of an existing air-conditioning system. The AFT unit as shown in FIG. 1 is very low in cost and is capable of increasing the efficiency of refrigerant cooling systems and heat pumps by ten (10) per cent or greater. In the southwestern areas of the United States where summer air-conditioning bills of $300.00 or more are not uncommon, this AFT unit can save as much as $30.00 a month in air-conditioning bills and pay for itself in a single month of operation.

Thus, the price-performance quotient for the AFT unit according to this invention represents a state-of-the-art breakthrough which has no equal in any known existing air-conditioning control units in this field.

Referring now to FIG. 2, the AFT timer 10 is functionally shown in brief detail inside the dotted region in this figure and includes the IC timer 12 and two sensitive gate TRIACs Q1 and Q2 whose functions are described in detail herein. A thermostat cooling contact TC is connected as shown to both the IC timer 12 and one end of the compressor relay CR, and the fan relay FR is connected between one side of the 24 volt AC transformer winding 20 and TRIAC Q2 main terminal T1. Q2 main terminal T2 is connected to transformer terminal 22.

In general functional terms, the thermostat contacts TC close to start a cooling cycle and connect the IC timer 12 to the 24 volt secondary winding 22 of the transformer 14. This action renders the IC timer 12 inoperative during the time that the thermostat contacts TC are closed. However, when the thermostat contacts TC open, the IC timer 12 is energized by way of an AC voltage which is applied via the compressor relay CR and the yellow lead Y and through DC rectification circuitry associated with the timer 12 and to be described below. It is important to note that the current flowing through the compressor relay winding at this time is insufficient in magnitude to close the compressor relay CR, but is sufficient in magnitude to activate the IC timer 12. The timer 12 will then have a timed-voltage on it's output line 16 for a predetermined time, typically 3-5 minutes, and this timed-voltage is applied to the gate or control electrode of a first sensitive gate TRIAC Q1. This timing voltage will trigger Q1 for the time-out period of the timer 12, and TRIAC Q1 will, in turn, trigger a second sensitive gate TRIAC Q2, also for the time-out period of the timer 12.

Therefore, Q2, which was previously triggered when TC was closed by having its gate connected to its T2, and which was only momentarily turned off when CR was deenergized as TC opened, now is triggered again to connect the fan relay FR across the 24 volt AC line. This switching action in turn maintains the fan relay FR energized for the duration of the time out period of the IC timer 12. At the end of this time out period, the two TRIACs Q1 and Q2 are turned off as the DC voltage on line 16 goes to zero, and the fan relay FR is then deenergized until such time as the above cycle repeats itself by the closing and openning of the thermostat cooling contacts TC.

Referring now to FIG. 3, the fan control circuit or system is generally designated as 8, and includes a fan duty cycle control unit 10. The system 8 is connected to receive input power from an alternating current (AC) source connected to input terminals 9 and 11. These terminals 9 and 11 are connected to the primary winding 16 of a step-down transformer 14. The secondary winding of this transformer 14 provides an operating voltage of about 24 volts AC which is connected as shown to a compressor relay (CR) and to a fan relay (FR) of the compressor-fan combination which is controlled in a manner to be further explained. The transformer 14, relays FR and CR, and thermostat TC associated with fan switch 21 are existing components of a conventional air-conditioning system as will be understood by those skilled in the art.

The connection terminal C for the compressor relay CR is connected through the thermostat contacts TC to one side of the 24-volt AC line 22, whereas the fan relay connection terminal F is connected through a power TRIAC Q2 to the AC line 22. The TRIAC Q2 has its gate 24 connected through resistor R2 to the "Auto-Fan" switch lead 26 which in turn connects to the AC line 22 when the switch 21 is in the "auto" position and thermostat contacts TC are closed and the compressor is running. These contacts TC also serve to connect one terminal 28 of the integrated-circuit timer 12 to the AC line 22 by way of a series resistor R1 and a diode D1. This terminal 28 is the positive DC side of the IC power supply, and the other side of the IC power supply is connected via terminal 32 and lead 34 back to the AC line 22. The capacitor C1 serves as a filter capacitor for the half-wave IC power supply.

Thus, with thermostat contacts TC closed, TRIAC Q2 is fired by having its gate tied to its main terminal T2 through R2 and TC. The resistor R3 serves to bias Q2 toward non-conduction to limit its gate sensitivity with temperature rise. With Q2 conducting, the fan relay FR is connected across the secondary transformer winding 20 and 22 and is also connected in parallel with the compressor relay CR. The compressor relay CR is connected across 20 and 22 via the closed thermostat contacts TC, thereby energizing the compressor.

A sensitive-gate TRIAC Q1 has one of its main terminals T1 connected to the AC line 22 and its other main terminal T2 connected to the gate of TRIAC Q1 through resistor R4. The gate 38 of TRIAC Q1 is connected through resistor R5 to the output terminal 16 of the IC timer 12. Thus, with the IC power supply shunted via terminals 28 and 32 with thermostat contacts TC closed, there is no output timing voltage at the timer output terminal 16 of the IC Timer 12, and the sensitive gate TRIAC Q1 is non-conducting at this time.

OPERATION-FIG. 3

When the thermostat contacts TC open after sufficient cooling, the gate 24 of Q2 is disconnected from the AC line 22 and Q2 is momentarily turned off. At the same time, the shunt connection across the IC timer power supply via terminals 28 and 32 is removed, thereby energizing the IC timer 12 through the compressor relay coil CR. The IC timer 12 then generates a DC "time-out" voltage at its output terminal 16, and this voltage is applied through resistor R5 to the gate 38 of the sensitive-gate TRIAC Q1 which draws only a few milliamperes of DC current from the IC timer 12. Therefore, the power consumption of the IC timer 12 and the TRIAC Q1 is very low and can be drawn through the compressor relay CR coil without closing the relay contacts associated therewith and without energizing the compressor of the air-conditioning system under control.

When Q1 fires, it connects the gate 24 of Q2 to the line 22 through resistor R4, thereby causing the TRIAC Q2 to again conduct, after a momentary shut-off, to again connect the fan relay FR across the 24-volt AC transformer winding for the duration of the "time-out" period of the IC timer 12. When the "on-time" of the IC timer 12 is complete, the voltage at its output terminal 16 goes to zero, thereby deenergizing both TRIACs Q1 and Q2. Terminal 16 of the IC timer 12 remains at zero potential with respect to the terminal 32 as long as power is supplied to terminal 28 through the coil CR with the thermostat contacts TC open. Thus, the duty cycle control unit 10 is shut down until the compressor is again cycled by the closing and opening of thermostat contacts TC. The IC timer 12 is reset by having its supply voltage removed and restored by thermostat cycling.

If the switch 21 is moved to the "Fan" mode at terminal 42, the indoor fan will run through the same process as if the thermostat TC were closed, but will continue to run until the switch 21 is again moved to the "Auto" position.

Figure 4:
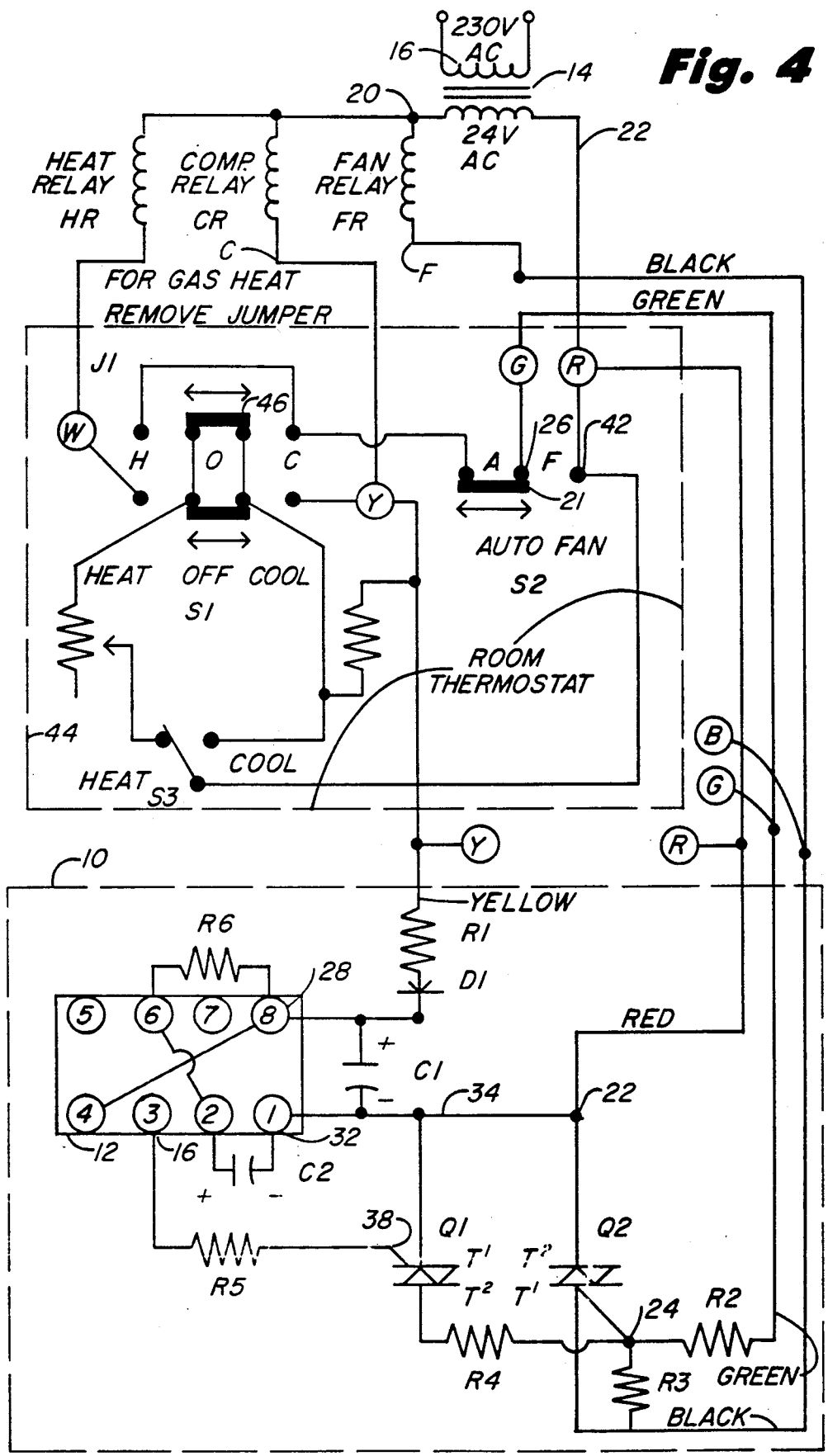
FIG. 4 is an even more detailed circuit diagram than that in FIG. 3 and shows the details of the electrical connections both to the room thermostat and to the IC timer in FIG. 3.

Most residential ducted air-conditioning systems are equipped to provide both heating and cooling using the same indoor fan and thermostat for both. The thermostat usually is provided with a "Heat-Off-Cool" switch as shown in FIG. 4 below. When this three-position switch is moved from "Cool" to "Heat", thermostat contacts TC are switched to close on termperature drop and are reconnected to control a heater relay, gas valve, or compressor and reversing valve. Heat is provided by:
1. Electric heating elements
2. Gas fired furnace
3. Heat pump (reverse refrigeration cycle) plus supplemental electric heating elements.

On units equipped with electric heating elements only, it is not desirable to keep the indoor fan running after the heat is turned off because very little heat is stored in these elements and cold air would start to flow in a very short time, at the sacrifice of comfort to the user. Since IC Timer 12 is energized through the Compressor Relay CR and shuts off Q1 after the predetermined time-out period of the Timer 12, and since CR is not cycled during heating, IC Timer 12 remains energized and Q1 remains off and the indoor fan is controlled by Q2 simultaneously with the operation of the heater relay which is connected to the "Auto" position of the "Auto-Fan" switch in the heat mode.

On units equipped with gas heaters, the indoor thermostat controls a gas valve, and the indoor fan usually is controlled by a separate line-voltage bonnet-thermostat which delay both starting and stopping of the fan to eliminate cold air on starting and removes stored heat before stopping the fan. Since the IC Timer 12 remains energized through the connection C and CR coil, and since Q1 remains timed out and off due to the abence of compressor cycling, and since the green terminal, which controls Q2 through S3, is isolated, the fan relay is inoperative.

On heat-pump units, Compressor Relay CR is cycled the same on both heating and cooling, and the indoor fan continues to run for the timed period of the IC Timer 12 to extract both cold and heat stored in the refrigerant coils after the compressor is stopped. Auxiliary electric heating elements are controlled independently by second stage thermostat contacts (not shown).

Thus, this invention accommodates all three types of air-conditioners in the precisely desired manner. This performance could not be accomplished by using a simple time-delay relay on the indoor fan control as might come to mind as a simplistic alternative to this invention.

The following table lists the component types, values and ratings used in a circuit and system according to FIG. 3 which I have successfully built and tested. This circuit and system enables me to practice this invention in accordance with the best mode known to me at the present time.

TABLE

Q2—Sensitive-gate TRIAC, 3 a, 100-volt, 3 ma Gate Trigger Current
Q1—Sensitive-gate TRIAC, 800 ma, 100-volt, 3 ma Gate Trigger Current
I.C. 12-#555 I.C. Timer
C1—100 mfd, 10-volt Electrolytic Capacitor
C2—47 mfd, 10-volt Electrolytic Capacitor
D1—1N2002 diode
R1—5 ¼ watt carbon film resistors
Custom printed circuit board 10 as shown in FIG. 1

However, it should be understood and appreciated by those skilled in the art that this table is not presented by way of limitation and that certain modifications may be made to the above preferred embodiment without departing from the scope of this invention.

For example, the timed period of the IC timer 12 can be controlled by substituting a variable resistor in place of the fixed resistor R6 on the IC timer.

Referring now to FIG. 4, the circuit in this figure includes all of the circuitry shown in FIG. 3 and in addition shows typical low-voltage room thermostat circuitry through which the novel timer unit described herein is connected to a conventional existing air-conditioning system. This system will typically include a heater relay HR, a compressor relay CR and a fan relay FR connected as shown to one side of the low voltage (24 volt AC) transformer terminal 20. These relays are connected as shown to the room thermostat 44, and the novel timer unit 10 of FIGS. 1, 2, and 3 is connected as shown to the thermostat terminals. The four output leads of the timer unit 10 are designated Y, R, G, and B and correspond to the conventional yellow, red, and green colors respectively which generally are used in the electrical wiring arts for identification in room thermostat connections. The black lead is for the alternative fan relay connection. The timer connections are shown in FIG. 4.

The resistors, capacitor, and TRIACs in FIG. 4 bear the same legend as is used for identical components in FIG. 3, and in addition, a capacitor C2 and a resistor R6 have been added to the pins of the IC timer 12 which is shown in more detail in FIG. 4.

The legend "H-O-C" on the thermostat 44 refers to the "Heat", "Off", and "Cool" positions of the three-position switch 46 shown with this legend, and the letters "A" and "F" shown with the two-position switch 21 refer to the "Automatic" and "Fan" positions of this switch in the following discussion of the operation of the circuit in FIG. 4.

OPERATION—FIG. 4

The unit in FIG. 4 consists of an integrated circuit timer 12 and two sensitive-gate TRIACs Q1 and Q2 interconnected as previously described to control the indoor-fan relay of a typical air-conditioning system equipped for refrigeration cooling and electric, gas or heat-pump heating. The IC timer 12 is a commercially available 8-pin, dual-in-line package #555 well known to those skilled in the art. It is not necessary to describe how the IC timer 12 functions internally, but the following is an explanation of what the timer does when it is connected as shown in FIG. 4:

Resistor R1, diode D1 and capacitor C1 supply DC power to the IC Timer 12 when an AC voltage is applied from the transformer secondary winding 20 through compressor relay coil CR (yellow timer lead Y) and the red timer lead R. When a DC voltage is applied to the IC terminals 1 and 8 (leads 32 and 28), the IC terminal 3 (lead 16) goes positive (high) with respect to the IC terminal 1 (lead 32). After the preset time-interval or "time out", which is determined by the values of R2 and C2, IC terminal 3, (lead 16) goes to zero. This terminal 3 remains at zero potential as long as DC power remains across IC terminals 1 and 8. When the DC voltage is interrupted across IC terminals 1 and 8 and is subsequently restored, the Timer 12 is reset and terminal 3 again goes positive until the time-out interval of the Timer 12 expires.

A TRIAC may be triggered to an AC conducting state in either of two ways for the requirement herein described:
1. By supplying an adequate DC current through its gate and main terminal T1.

2. By switching its gate through a resistor to its main terminal T2.

The two sensitive-gate TRIACs are connected as shown in FIG. 4. Q1 is a small 0.8 a TRIAC requiring 3 ma DC gate-trigger current. Because of this rating, the load on the IC Timer 12 is relatively small. When the TRIAC Q1 is triggered, it acts as an AC switch when DC from the IC terminals 1 and 3 is applied across its gate and its main terminal T1. Q2 is a larger TRIAC and is so chosen to handle the load current to the fan-relay coil FR. TRIAC Q2 is triggered by having its gate switched through a resistor R3 to its main terminal T1. Because of its sensitivity, the gate of Q2 can be biased off with a relatively low-value resistor R3 across its gate and Main Terminal T1, and can be triggered in spite of this biased condition through a relatively high-value resistor R4. The purpose of the biasing resistor R3 is to preclude an undesirable increase in gate sensitivity of Q2 with temperature rise. The resistor R2 is selected with a high enough value to preclude false triggering.

When the timer unit colored leads (Y, R, G, AND B) are connected to a typical air-conditioning room thermostat 44 as shown in FIG. 4, it functions to control the indoor fan as follows: With the "Heat-Off-Cool" Switch S1 in the "Cool" position and with the "Auto-Fan" Switch S2 in the "Auto" position and with the thermostat double-pole Switch S3 in the "Cool" position, the compressor relay coil CR is energized across the transformer secondary winding by the yellow and red terminals Y and R which then are connected together. Since the yellow and red terminals Y and R supply power to the IC Timer 12, the Timer 12 is shunted and deenergized at this time. This is a reset condition and it readies the Timer 12 for its timing sequence when it is next energized. The gate of TRIAC Q2 is connected to T2 through resistor R4, switch S2, switch S1, and switch S3. The yellow, red, and green leads are tied together at this time. This connection triggers TRIAC Q2, and it in turn energizes the fan relay coil FR simultaneously with the energizing of CR.

When the cooling requirement for the indoor environment is satisfied and the switch S3 "cool" contacts open, the timer unit 12 is now energized through the relay coil CR to the transformer terminals 20 and 22. This action is produced by the removal of the shunt connection formed by the red and yellow leads R and Y having been connected. The timer 12 is now reset and the TRIAC Q1 is triggered for the timed interval of the Timer 12. TRIAC Q1 acts as a switch to connect the gate of TRIAC Q2 to its terminal T2. Q2 thus is returned, almost simultaneously, to a trigged state, and Q2 keeps the fan relay FR energized for the time-out interval of the Timer 12 after CR is deenergized.

The fan of the air-conditioning system under control of the present invention thus is kept running for about 3 minutes after the compressor thereof is stopped, thereby salvaging some of the "cold" stored in its refrigerant evaporator coils and ducts. Some of this "cold" would otherwise be lost due to less than perfect insulation in all existing air-conditioning systems. It has been estimated that the salvaging of this loss can result in a 10–15% reduction in energy consumption.

Referring again to FIG. 4, it is important to note and to clearly understand that for existing air-conditioning systems which do not make use of the present invention, the fan relay lead F is connected directly to the fan terminal 26 inside the room thermostat compartment and causes the fan relay FR to be controlled simultaneously with the compressor relay CR. However, with the black and green leads of the AFT timer connected as shown directly between the fan relay lead F and the terminal 26 in the thermostat compartment, this connection places the fan relay FR under complete control of the AFT timer unit. Nowhere in the prior art is there a suggestion of this particular connection and control feature. Using this connection, the fan relay can only be turned on and off when the load TRIAC Q2 turns on and off in the manner described above. It is believed that a complete appreciation of both the above connection, and the ease thereof, to existing air-conditioning systems on the one hand and the corresponding ease of connection and operability of the low cost and high efficiency AFT timer unit of this invention on the other hand is the key to understanding the elegant simplicity of this invention.

There is not even a remote suggestion in the Abey, Kinsey, Cartmell, and Schrader, et.al references in the prosecution history of this case of either this elegantly simple operational feature described herein or the above circuit connections and low cost AFT unit which makes this novel feature possible. This operational feature of the AFT timer unit in turn makes possible a significant reduction of air-conditioning bills by as much as 10 percent or more. This one month's reduction in an air-conditioning bill for some high-load months out of the year will pay for the low cost of an AFT unit in one month's time in some geographical areas of the country.

Many air-conditioning systems in mild climates are equipped with electric resistance heat-strips or coils which provide a source of heat through the same indoor-fan and duct system that is used for cooling. Since these elements heat up and cool down quickly, it is not desirable to delay stopping the fan after they are deenergized. The timer 12 does not function on such units; that is, when the switch S1 is moved to the "Heat" position, the compressor relay CR is disconnected from the thermostat contacts S3 and a heat relay HR is connected to the "Heat" contact of the double-throw thermostat switch S3. The red, green, and white leads are then tied together when the thermostat unit 44 calls for heat. Thus, by the same means as described for cooling, the fan and heat relays FR and HR are energized simultaneously. However, since the relay CR is isolated from the thermostat 44, the timer 12 remains energized and timed-out during such heating, and the fan and heat relays FR and CR are deenergized simultaneously as desired.

Many air-conditioners are equipped with gas heaters, and these heaters use the same fan and duct system for both heating and cooling. Since the gas flues and plenum of these air-conditioners cycle through a wide temperature range and store a relatively large quantity of heat, it is customary to control the fan in these gas heating systems with a separate line-voltage plenum thermostat. This action delays the start of the fan until the plenum heat rises sufficiently, and thus avoids an initial flow of cool air. Likewise, the stopping of the fan of these systems is delayed until the plenum cools sufficiently, thus extracting stored heat.

The jumper J1 on switch S1 is removed for gas-fired units. This isolates the green terminal G from the thermostat contacts S3 and thereby renders Q2 inoperative by the room thermostat, and Q1 cannot conduct and fire Q2 since Timer 12 is energized through CR and timed-out. Thus the fan relay FR does not function and the fan is controlled by the plenum thermostat as previously described.

Modifications may be made in the above described circuitry without departing from the scope of my invention. However, it should be clearly understood that one cannot simply interchange an AC driven relay for the TRIAC Q2 described above, because the only voltage path from point F to transformer connection 20 is through FR. Since the relay contacts would energize FR, by connecting F to 22, this voltage would disappear and the circuit would oscillate. So here is significant evidence of the high degree of novelty in the use of the timer-controlled, low-current operated TRIACs in the manner described above to continue the fan or blower of an existing air-conditioning system to run for a pre-set time after the compressor shuts off. This feature of the present invention, whereby Q2 is triggered by a simple microcurrent switching action without a connection to Transformer Terminal 20, and other features previously described, clearly and uniquely distinguishes it from any of the prior art cited against my above-identified related patent applications or otherwise known to me. Thus, the AFT unit described herein can be simply connected to existing thermostat terminals without access to other wiring or the need for additional wiring. Installation on existing conventional units is so easy that much of its novelty lies in its size, low cost, and practicality alone.

I claim:

1. An air conditioning control unit capable of being constructed on a small printed circuit board and operative solely in response to the opening and closing of indoor room thermostat contacts or a manual switch therefor, said unit connectable directly to a room indoor thermostat for an existing air condition system without requiring any other wiring connections to electrical circuitry remote from said room indoor thermostat, said unit comprising:
   a. a low voltage room thermostat fan terminal, F, connectable to a fan relay which is used for controlling the on and off operation of a fan associated with said air conditioning system,
   b. a low voltage compressor relay terminal, C, connectable to a compressor relay which is used for controlling the on and off operation of a compressor for said air conditioning system, said compressor relay terminal C being further connectable to thermostat contacts, TC,
   c. timing circuit means connected to both of said fan relay and said compressor relay terminals F and C and responsive only to a change in voltage level at said compressor relay terminal C when said thermostat contacts, TC, open for energizing said fan relay for a predetermined time after said compressor turns off, and being non-responsive to other changes in low voltage levels within said thermostat, whereby said air conditioning control unit may be economically constructed on a small printed circuit board without making wiring connections or changes remote from said thermostat and connected directly to said room indoor thermostat, and said timing circuit means and has no effect on the on and off operation of said fan relay produced by the on and off switching of other heating or cooling units such as gas or oil fired units or electrical heating elements which may be connected to said thermostat,
   d. said timing circuit means including an integrated circuit timer connected to said compressor relay terminal, C,
   e. a first, sensitive gate TRIAC connected to said integrated circuit timer for switching on and off in response to the on and off operation of said integrated circuit timer, and
   f. a second, power TRIAC connected between said first, sensitive gate TRIAC and said fan relay terminal, F, for switching on and off in response to the operation of said first, sensitive gate TRIAC and thereby continuing said fan relay to operate for a predetermined time after said compressor shuts off.

2. A method for controlling the on-off time of an indoor fan which is controlled by and associated with an indoor thermostat for a room air conditioning system, said air conditioning system having thermostat contacts, TC, connected to a low voltage compressor relay terminal, C, at one end of a compressor relay, CR, comprising the steps of:
   a. producing a change in voltage at said compressor relay terminal, C, inside a low voltage thermostat compartment of said air conditioning system upon the opening of said thermostat contacts, TC,
   b. initiating a timing voltage only in response to said change in voltage at said compressor relay terminal, C,
   c. providing a switching action in response to said timing voltage which is sufficient to energize said indoor fan for a predetermined time after said compressor relay is de-energized upon the opening of said thermostat contacts, TC, and said initiation of said timing voltage includes:
   d. connecting a low voltage timer to said compressor relay terminal, C, and
   e. drawing a small current in series through said compressor relay to activate said timer when said compressor relay is de-energized.

3. The method defined in claim 2 wherein the provision of said switching action includes:
   a. utilizing a power TRIAC, Q2, which is connected in series with a fan relay for said indoor fan, and
   b. utilizing said timing voltage to turn on said power TRIAC Q2.

4. The method defined in claim 3 wherein said timing voltage is utilized to turn on said power TRIAC, Q2, by:
   a. connecting a sensitive gate TRIAC, Q1, between said low voltage timer and said power TRIAC, Q2, and
   b. driving said sensitive gate TRIAC, Q1, into conduction by a low level DC output timing voltage from said timer to in turn drive said power TRIAC, Q2, to conduction and energize said indoor fan.

* * * * *